(12) United States Patent
Yamazaki

(10) Patent No.: US 7,722,078 B2
(45) Date of Patent: May 25, 2010

(54) GAS GENERATOR AND RESTRAINING DEVICE USING SAME

(75) Inventor: Masayuki Yamazaki, Tatsuno (JP)

(73) Assignee: Daicel Chemical Industries, Ltd., Osaka-shi (JP)

( * ) Notice: Subject to any disclaimer, the term of this patent is extended or adjusted under 35 U.S.C. 154(b) by 184 days.

(21) Appl. No.: 11/959,340

(22) Filed: Dec. 18, 2007

(65) Prior Publication Data
US 2008/0143088 A1 Jun. 19, 2008

Related U.S. Application Data

(60) Provisional application No. 60/871,070, filed on Dec. 20, 2006.

(30) Foreign Application Priority Data
Dec. 18, 2006 (JP) .............................. 2006-339528

(51) Int. Cl.
*B60R 21/217* (2006.01)
(52) U.S. Cl. ...................................... 280/739
(58) Field of Classification Search ................ 102/530, 102/531, 704; 280/736, 740, 741, 742
See application file for complete search history.

(56) References Cited

U.S. PATENT DOCUMENTS

| | | | | |
|---|---|---|---|---|
| 5,149,129 A | * | 9/1992 | Unterforsthuber et al. .. | 280/740 |
| 5,505,488 A | * | 4/1996 | Allard ......................... | 280/740 |
| 5,525,306 A | * | 6/1996 | Schmucker et al. .......... | 422/165 |
| 5,738,374 A | * | 4/1998 | Marsaud et al. .............. | 280/741 |
| 5,851,028 A | * | 12/1998 | Thibodeau .................. | 280/736 |
| 6,135,496 A | * | 10/2000 | Katsuda et al. ............. | 280/736 |
| 6,189,924 B1 | * | 2/2001 | Hock .......................... | 280/736 |
| 6,224,098 B1 | * | 5/2001 | Katsuda et al. ............. | 280/741 |
| 6,234,521 B1 | | 5/2001 | Katsuda et al. | |
| 6,336,660 B1 | * | 1/2002 | Katsuda et al. ............. | 280/741 |
| 6,412,815 B1 | | 7/2002 | Nakashima et al. | |
| 6,598,901 B2 | * | 7/2003 | Nakashima et al. ......... | 280/736 |
| 6,722,694 B1 | | 4/2004 | Nakashima et al. | |
| 2002/0079681 A1 | * | 6/2002 | Yamazaki et al. ........... | 280/741 |
| 2002/0190511 A1 | * | 12/2002 | Watase et al. ............... | 280/740 |
| 2003/0160437 A1 | | 8/2003 | Ohji et al. | |
| 2004/0135356 A1 | | 7/2004 | Katsuda et al. | |

FOREIGN PATENT DOCUMENTS

| | | |
|---|---|---|
| JP | 10-95302 A | 4/1998 |
| JP | 2001-97175 A | 4/2001 |
| JP | 2001-225711 A | 8/2001 |
| JP | 2003-34219 A | 2/2003 |
| JP | 2004-82995 A | 3/2004 |

* cited by examiner

*Primary Examiner*—Paul N. Dickson
*Assistant Examiner*—Robert A Coker
(74) *Attorney, Agent, or Firm*—Birch, Stewart, Kolasch & Birch, LLP

(57) ABSTRACT

A gas generator includes, a housing having a gas discharge port closed, from the inside thereof, by a closing member; an ignition device accommodated inside the housing; and a gas generating agent ignited and burnt by activation of the ignition device to generate combustion gas. The gas discharge port includes a plurality of gas discharge port groups or a plurality of gas discharge ports, the plurality of gas discharge port groups or the plurality of gas discharge ports are opened by different pressures, respectively, and among the plurality of gas discharge port groups or the plurality of gas discharge ports, at least the gas discharge port group or the gas discharge port that is opened by higher pressure is covered with a cooling member from the outside.

16 Claims, 8 Drawing Sheets

GAS GENERATOR AND RESTRAINING DEVICE USING SAME

This nonprovisional application claims priority under 35 U.S.C. §119(a) on Patent Application No. 2006-339528 filed in Japan on 18 Dec. 2006 and 35 U.S.C. §119(e) on U.S. Provisional Application No. 60/871,070 filed on 20 Dec. 2006, which are incorporated by reference.

BACKGROUND OF INVENTION

1. Field of Invention

The present invention relates to a gas generator and a restraining device using the same.

2. Description of the Related Art

There is known a fact that when a gas generator installed in a vehicle is activated, an output pressure changes with the environmental temperature (for example, the output pressure of the gas generator is slightly high when the temperature is high, and the output pressure of the gas generator is slightly low when the temperature is low), thus a method of controlling the combustion internal pressure inside a housing of a gas generator is adopted in order to restrain such changes.

JP-A No. 2003-34219 discloses a gas generator in which gas discharge ports 126a, 126b having two different diameters are formed in a housing and sealed by sealing tapes 27. The sealing tape that covers the port 126a having larger open area ruptures at lower pressure, and, as described in the specification, "[0034] Furthermore, even when the housing is provided with only a single combustion chamber, only the gas discharge port having larger open area is opened when the external environmental temperature is low when the gas generator is activated, and both the gas discharge port having larger open area and the gas discharge port having smaller open area are opened when the external environmental temperature is an ambient temperature or high temperature, whereby more stable combustion internal pressure can be obtained." In this case, when the housing internal pressure is increased during a combustion under a high temperature, it is inhibited that a burning rate of the gas generating agent is accelerated to increase the output pressure more than the that obtained in the combustion under an ambient temperature or a low temperature.

JP-A No. 2004-82995 discloses a mechanism for continuously changing the amount of filters covering a periphery of the gas discharge ports to thereby change the output pressure. For example, by using a signal sent from a sensor for detecting the sitting state or the weight of the occupant, the amount of filters closing the gas discharge ports is changed, and the temperature of gas to be discharged is adjusted, whereby the output pressure is controlled.

SUMMARY OF THE INVENTION

The present invention provides a gas generator, including:
a housing having a gas discharge port closed, from the inside thereof, by a closing member;
an ignition device accommodated inside the housing; and
a gas generating agent ignited and burnt by activation of the ignition device to generate combustion gas,
wherein the gas discharge port consists of a plurality of gas discharge port groups or a plurality of gas discharge ports,
the plurality of gas discharge port groups or the plurality of gas discharge ports are opened by different pressures, respectively,
among the plurality of gas discharge port groups or the plurality of gas discharge ports, at least the gas discharge port group or the gas discharge port that is opened by the highest pressure is covered with a cooling member from the outside.

The present invention provides a restraining device in which the above gas generator is accommodated in a module case, the module case being attached with a cooling member.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
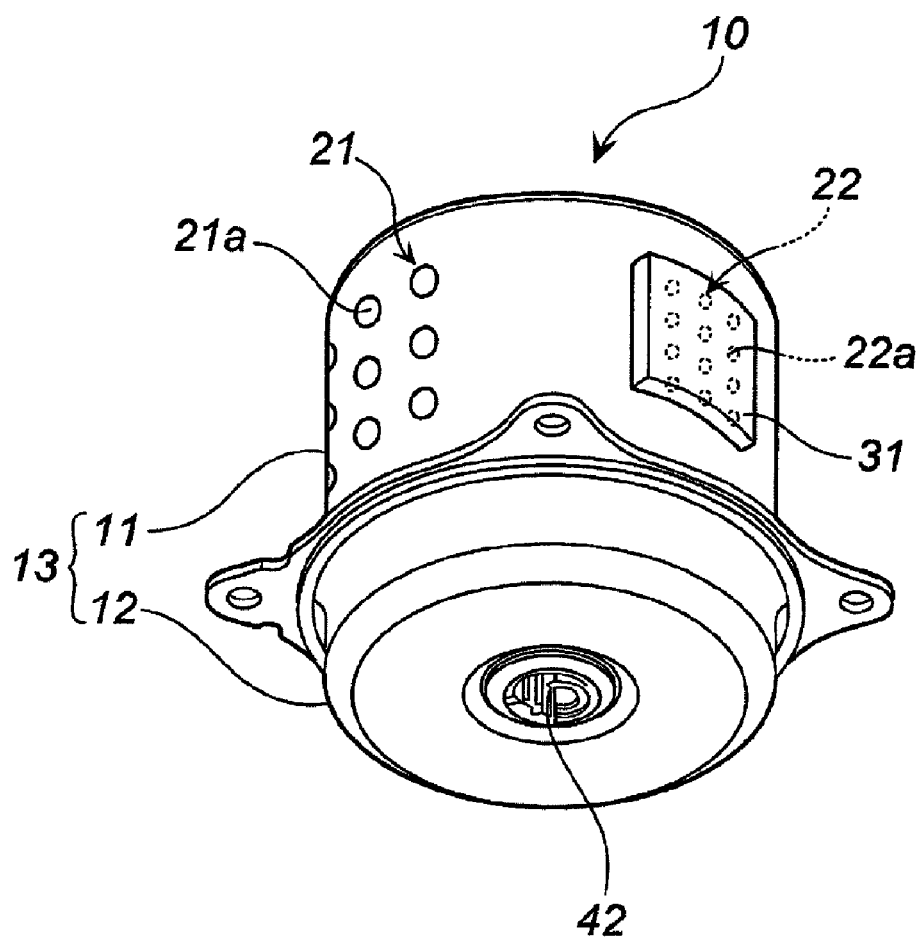
FIG. 1 shows a perspective view of a gas generator of the present invention.

Since, in JP-A No. 2003-34219, the temperature of the discharged combustion gas is higher than that at the time of an ambient temperature or low temperature, there is room for improvement in terms of preventing the generation of difference in the output pressure.

The device of JP-A No. 2004-82995 does not function alone, thus it is always necessary to combine a sensor (for detecting the sitting state or the weight of the occupant), and a control system that controls this sensor, and there is room for improvement in terms of simplifying the entire device.

The present invention provides a gas generator capable of reducing the difference in the output pressure caused by the differences in environmental temperatures when the gas generator is activated, and a restraining device that uses this gas generator.

The gas generator is installed in a restraining device, such as an airbag apparatus of a vehicle. The environmental temperature obtained at the time of activation varies significantly between the cases for a closed vehicle in a low latitude area during the summer and a vehicle at midwinter in a high latitude area. When the pressure within the combustion chamber (internal pressure) obtained during activation of the gas generator changes with the environmental temperature obtained at the time of activation, output pressure of the gas generator fluctuates. Thus, prevention of the internal pressure difference caused by an environmental temperature difference has been studied. However, since the gas temperature itself changes with the environmental temperature, it is difficult to reduce the fluctuation of the output pressure of the gas generator simply by controlling the internal pressure difference generated at the time of activation.

Therefore, the present invention is contrived to solve such problems by reducing not only the internal pressure difference caused by an environmental temperature difference but also by reducing the difference in temperature of generated gas.

The gas generator of the present invention is that the large number of gas discharge ports formed in the housing consist of a plurality of gas discharge port groups or a plurality of gas discharge ports, the gas discharge port groups or the gas discharge ports are opened in multi-stages respectively in response to the increase of the pressure within the housing (internal pressure) (namely, the sealing member that seals the gas discharge ports from the inside is ruptured, whereby the gas discharge ports are opened). The gas generator of the present invention includes the case in which the gas discharge ports are not opened, depending on the condition of the internal pressure.

The term "plurality of gas discharge port groups" means that one group including a plurality of gas discharge ports is present in plural, while the term "plurality of gas discharge ports" means that a plurality of gas discharge ports are disposed one by one and separately.

There are no particular restrictions on ways for opening the gas discharge port groups or gas discharge ports in multi-stages respectively, thus a method of changing the diameter of each gas discharge port, a method of changing the strength of the sealing member, or other method can be applied.

When the combustion gas, generated within the housing, is discharged to the outside (airbag or the like) via the gas discharge ports, the internal pressure increases in a high-temperature environment, thus not only the gas discharge port groups or gas discharge ports opened at low pressure but also those opened at high pressure are opened. On the other hand, since the internal pressure is low in a low-temperature environment, some gas discharge port groups or gas discharge ports are not opened.

Therefore, at the time of high-temperature combustion, the internal pressure is prevented from being increased by the larger total open area of the gas discharge ports, while at the time of low-temperature combustion, the internal pressure is increased as the total open area of the gas discharge ports keeps small, whereby the occurrence of the difference in the output pressure is prevented.

In the present invention, among the plurality of gas discharge port groups or plurality of gas discharge ports, at least gas discharge port group or gas discharge port opened at the highest pressure is covered, from the outside, by a cooling member.

As described above, since the internal pressure increases in a high-temperature environment at the time of activation, the gas discharge port groups or gas discharge ports opened at high pressure are also opened, but, at this moment, the combustion gas that passes through the gas discharge port groups or gas discharge ports opened at high pressure is cooled by the cooling member, whereby the temperature of the gas to be discharged in activation in a high-temperature environment can be approximated to the temperature of the discharged gas obtained in a low-temperature or an ambient temperature environment, whereby the difference in the output pressure of the gas generator, which is caused under the activation environment, can be further reduced.

The cooling member may be any member capable of contacting the combustion gas to reduce the temperature thereof, and, for example, a member for cooling by allowing the passage of the combustion gas, and a member for cooling by colliding with the combustion gas, thus a coolant/filter used in a known gas generator for an airbag, a highly thermal conductive metallic plate or the like can be used.

The gas generator of the present invention can be applied to a pyrotechnic gas generator that burns a solid gas generating agent to generate gas, or a hybrid gas generator that uses pressurized gas as well in combination. Moreover, the gas generator may have one igniter (single) or a plurality of igniters (dual, etc.). The gas generator may be used as a gas generator for inflating the airbag on the driver side or the passenger side next to the driver of a vehicle, or a gas generator used in a restraining device for pedestrian protection.

The present invention further provides the gas generator, wherein among the plurality of gas discharge port groups or plurality of gas discharge ports, the gas discharge port group or gas discharge port opened at the highest pressure is covered, from the outside, by the cooling member, and gas discharge port group or gas discharge port opened at the lowest pressure is not covered, from the outside, by the cooling member.

In this manner, the difference in the output pressure of the gas generator, which is caused by the activation environment, is prevented from occurring. It should be noted that if there exist the gas discharge port groups or gas discharge ports not covered, from the outside, by the cooling member, it is desired that a known coolant/filter be disposed in the inside of the housing.

The present invention further provides the gas generator, wherein all of the plurality of gas discharge port groups or plurality of discharge ports are covered, from the outside, by the cooling member, and the cooling member that covers the gas discharge port group or the gas discharge port opened at the highest pressure produces the maximum cooling effect, while the cooling member that covers the gas discharge port group or the gas discharge port opened at the lowest pressure produces the minimum cooling effect.

In this manner, the difference in the output pressure of the gas generator, which is caused by the activation environment is prevented from occurring. In this invention, the coolant/filter disposed inside the housing may not be required.

In order to adjust the cooling effect of the cooling member, a method may be applied in which the bulk density, area, volume, pressure loss and the like of the cooling member are increased or decreased to increase or decrease the contact area with the gas.

The present invention further provides the gas generator, wherein
  the gas discharge port groups or gas discharge ports have different diameters for each gas discharge port group or gas discharge port, and are disposed separately in different areas for each gas discharge port group or gas discharge port having the different diameters,
  all of the gas discharge port groups or gas discharge ports are sealed, from the inside, by a same sealing member, and
  among the gas discharge port groups or gas discharge ports, a gas discharge port group or a gas discharge port having the maximum diameter is opened at the lowest pressure, and a gas discharge port group or a gas discharge port having the minimum diameter is opened at the highest pressure.

In this invention, a method of changing the diameters of the gas discharge ports is applied in order to open the gas discharge port groups or gas discharge ports in multi-stages respectively.

The plurality of gas discharge port groups can be categorized into, for example, a group of the minimum gas discharge ports having the minimum diameter, a group of intermediate gas discharge ports having an intermediate diameter, and a group of the maximum gas discharge ports having the maximum diameter, and each group is disposed separately in different areas. It is preferred that the plurality of gas discharge port groups be disposed on a peripheral surface of the housing at regular intervals.

Although the situation where the areas are formed is not particularly restricted, for example, the minimum gas discharge port group, the intermediate gas discharge port group, and the maximum gas discharge port group can be positioned within separate square (or rectangular or circular) areas respectively.

The plurality of gas discharge ports can be categorized into, for example, the minimum gas discharge port having the minimum diameter, an intermediate gas discharge port having an intermediate diameter, and the maximum gas discharge port having the maximum diameter, and these gas discharge ports are disposed apart from one another. It is preferred that the plurality of gas discharge ports be disposed on the peripheral surface of the housing at regular intervals.

The present invention further provides the gas generator, wherein all of the gas discharge port groups or gas discharge ports are formed by gas discharge ports having the same diameter and are disposed separately in a plurality of different areas, the gas discharge port groups or gas discharge ports are respectively sealed by sealing members having different strength, and among the gas discharge port groups or gas discharge ports, the gas discharge port group or the gas discharge port that is sealed by the sealing member of the minimum strength is opened at the lowest pressure, while the gas discharge port group or gas discharge port sealed by the sealing member of the maximum strength is opened at the highest pressure.

In this invention, in order to open the gas discharge port groups or gas discharge ports in multi-stages respectively, a method for changing the strength of the sealing members sealing the gas discharge ports is applied. With regard to the strength of the sealing members, a method of changing the thickness of the members, a method of changing the material of the members, a method of providing a fragile portion with a notch and the like on each member, or other method can be applied.

Although the situation where the areas are formed is not particularly restricted, for example, the plurality of gas discharge port groups having the same diameter can be positioned within separate square (or rectangular or circular) areas respectively.

The present invention further provides the gas generator, wherein a space is provided between each of the gas discharge port groups or gas discharge ports and the cooling member.

In this manner, the gas can be caused to pass through the entire cooling member, improving the cooling efficiency and preventing the cooling member from being damaged.

The present invention further provides the gas generator, wherein the cooling member is a metallic plate.

It is possible to use the cooling member formed from a metallic plate made of aluminum, iron or the like when providing the space between the gas discharge port group and the cooling member, which causes the advantage in terms of weight reduction, cost control, and assembling workability.

The present invention further provides the gas generator, wherein the cooling member is a metallic plate having concaves and convexes on a surface thereof that faces the gas discharge port group or the gas discharge port.

For example, by providing waveform concaves and convexes on a surface of the metallic plate, the contact area between the metallic plate and the gas is improved, enhancing the cooling effect.

The works become easier when the cooling member is attached to the module case than when the cooling member is attached to the gas generator, thus the work of attaching the gas generator to the module case becomes facilitated.

The present invention further provides the restraining device, wherein the cooling member is attached to an attaching member for fixing the gas generator to the module case.

Since the cooling member is to be attached to the attaching member that already exists, the entire structure becomes simpler, which is advantageous in terms of size and weight reduction.

In the case in which the gas generator of the present invention is used in an air bag apparatus of a vehicle, the internal pressure of the gas generator is prevented from fluctuating at the time of activation of the gas generator even when the environmental temperature changes depending on the usage environment of the vehicle, and, by reducing the temperature difference in the generated gas, fluctuation of the output pressure of the gas generator is diminished, stabilizing the output pressure of the gas generator more. Accordingly, the difference in the restraining performance of the air bag apparatus can be reduced by means of a change in the environmental temperature, the load that is imposed on the airbag when gas is discharged from the gas generator can be reduced, and the strength required on the bag can be reduced, leading to cost down.

Figure 2:
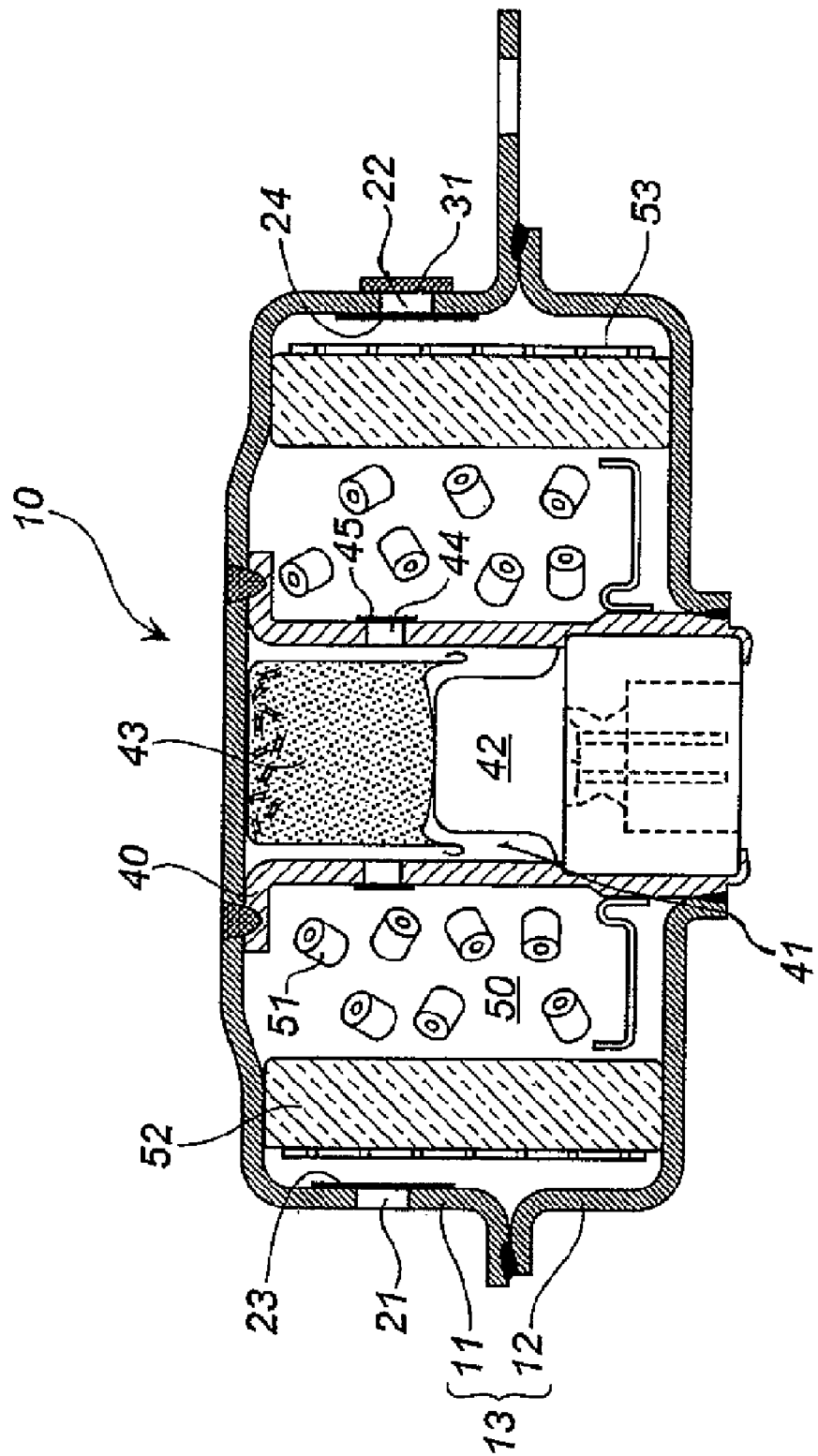
FIG. 2 shows a longitudinal sectional view of the gas generator shown in FIG. 1.

Embodiments of Invention (1) Gas Generator Shown in FIGS. 1 and 2

FIG. 1 is a perspective view showing the exterior appearance of the gas generator of the present invention, and FIG. 2 is a longitudinal sectional view of FIG. 1. It should be noted in FIG. 2 that a gas discharge port group constituted by a plurality of gas discharge ports is simplified and the entirety thereof is illustrated as a single opening. The gas generator shown in FIG. 1 and FIG. 2 are suitable as a gas generator for a passenger side.

The outer shell of a gas generator 10 is formed by a housing 13 formed by joining and integrating a diffuser shell 11 and a closure shell 12.

A peripheral surface of the diffuser shell 11 has a maximum-diameter gas discharge port group 21 (second group of gas discharge ports) formed by a plurality of (nine, as shown in FIG. 1) gas discharge ports 21a having the maximum diameter, and a minimum-diameter gas discharge port group 22 (first group of gas discharge ports) formed by a plurality of (twelve, as shown in FIG. 1) gas discharge ports 22a having the minimum diameter. The maximum-diameter gas discharge port group 21 and the minimum-diameter gas discharge port group 22 are sealed respectively, from the inside, by aluminum sealing tapes 23, 24 (see FIG. 2) having a thickness of approximately 50 μm. The sealing tapes 23, 24 may be separate or one integrated body.

Although not shown, one or two of each of the maximum-diameter gas discharge port group 21 and minimum-diameter gas discharge port group 22 may be further formed. When forming two maximum-diameter gas discharge port groups 21, these groups are formed so as to be positioned opposite to each other, and when forming three maximum-diameter gas discharge port groups 21, these groups are formed so as to be positioned at regular intervals. The same is true in the case in which two or three minimum-diameter gas discharge port groups 22 are formed.

When activating the gas generator, the maximum-diameter gas discharge port group 21 is opened at pressure smaller than that required to open the minimum-diameter gas discharge port group 22, while the minimum-diameter gas discharge port group 22 is opened at pressure larger than that required to open the maximum-diameter gas discharge port group 21.

The maximum-diameter gas discharge port group 21 and the minimum-diameter gas discharge port group 22 have the plurality of gas discharge ports 21a, 22a provided in rectangular areas respectively, and these areas are separated from each other.

A cooling filter 31 is provided for the minimum-diameter gas discharge port group 22 from the outside so as to completely cover all of the gas discharge ports 22a. The maximum-diameter gas discharge port group 21 is not covered from the outside by a cooling filter. It should be noted in FIG. 1 that the minimum-diameter gas discharge port group 22, which is actually made invisible due to the cooling filter 31, is shown visibly so that the position of the minimum-diameter gas discharge port group 22 can be confirmed.

As the cooling filter 31, an object that is obtained by deforming a wire mesh made of stainless steel into a wave shape and fitting it into a mold for compression-molding is used. The diameter of a wire rod is 0.3 through 0.5 mm and the bulk density is 3 through 5 g/cm$^3$. The cooling filter 31 is fixed by welding to an outer surface of the diffuser shell 11.

In place of the cooling filter 31 described above, highly thermal conductive metallic plate (an aluminum plate, for example) can be used as the cooling member. In this case, a space wide enough for combustion gas to move through is provided between the cooling member made from a metallic plate and the gas discharge port group. Moreover, concaves and convexes in a wave-form can be provided on a surface of the metallic plate (a surface facing the gas discharge port group) so as to increase the contact area thereof with the combustion gas.

The interior of the gas generator 10 has a known structure, and the gas generator 10 may have not only the one shown in FIG. 2 but also the structures shown in FIG. 15 and FIG. 19 of JP-A No. 2001-97175 and in FIG. 32 of JP-A No. 2001-225711.

As shown in FIG. 2, an inner cylindrical member 40 is disposed within the hosing 13, an ignition means accommodating chamber 41 is defined inside the inner cylindrical member 40, and a combustion chamber 50 is defined outside the same.

An electric igniter 42, activated by receiving an activation signal, and a transfer charge 43, ignited and burned by the activation of the igniter 42, are disposed inside the ignition means accommodating chamber 41. A gas generating agent(s) 51 is(are) charged into the combustion chamber 50. A plurality of flame-transferring holes 44 is formed on a peripheral surface of the inner cylindrical member 40. Each of the flame-transferring holes 44 is sealed from the outside by a sealing tape 45.

A coolant/filter 52 for cooling and purifying the combustion gas generated by burning the gas generating agent 51 is disposed radially on the outside of the combustion chamber 50. A porous cylindrical outer layer 53 is fitted to an outer peripheral surface of the coolant/filter 52.

Next is described an operation performed when incorporating the gas generator shown in FIG. 1 and FIG. 2 into an airbag apparatus of a vehicle.

When the vehicle collides, the igniter 42 is activated in response to a command from an impact sensor or a control unit, and then the transfer charge 43 is ignited. Thus generated flame and high-temperature gas start burning the gas generating agent 51 within the combustion chamber 50 to generate high-temperature gas. The high-temperature gas passes through the coolant/filter 52 to reach the gas discharge port groups 21 and 22.

In the case in which the temperature of the environment of the vehicle is an ambient temperature (approximately at 20° C.), the internal pressure obtained when the gas generating agent 51 is burned (the pressure inside the combustion chamber 50) is not so high, thus only the sealing tape 23 sealing the maximum-diameter gas discharge port group 21 from the inside ruptures. Then, the combustion gas is discharged only from the maximum-diameter gas discharge port group 21, inflating an airbag. At this moment, the sealing tape 24 sealing the minimum-diameter gas discharge port group 22 from the inside does not rupture, thus the minimum-diameter gas discharge port group 22 is not opened. Therefore, due to the small total open area, the decrease of the internal pressure is retrained, and the burning rate of the gas generating agent 51 is prevented from decreasing.

In the case in which the temperature of the environment of the vehicle is high (when, for example, the vehicle departed and then soon had an accident after being parked for a long time during the summer with the doors of the vehicle closed (approximately 80° C.)), the temperature inside the vehicle is still high, and the internal pressure of the gas generator 10 at the time of activation is higher than that obtained at an ambient temperature, thus both the sealing tapes 23 and 24 rupture, whereby the maximum-diameter gas discharge port group 21 and the minimum-diameter gas discharge port group 22 are opened.

At this moment, since the maximum-diameter gas discharge port group 21 and the minimum-diameter gas discharge port group 22 are opened, the increase of the housing internal pressure is prevented, and the burning rate of the gas generating agent 51 is also prevented from increasing. The temperature of the generated combustion gas itself is higher than that obtained at the ambient temperature. However, the combustion gas passing through the minimum-diameter gas discharge port group 22 is cooled as it passes through the cooling filter 31, and then flows into the airbag, thus the increase of the temperature of the entire combustion gas is restrained and fluctuation of the output pressure is also prevented.

Figure 3:
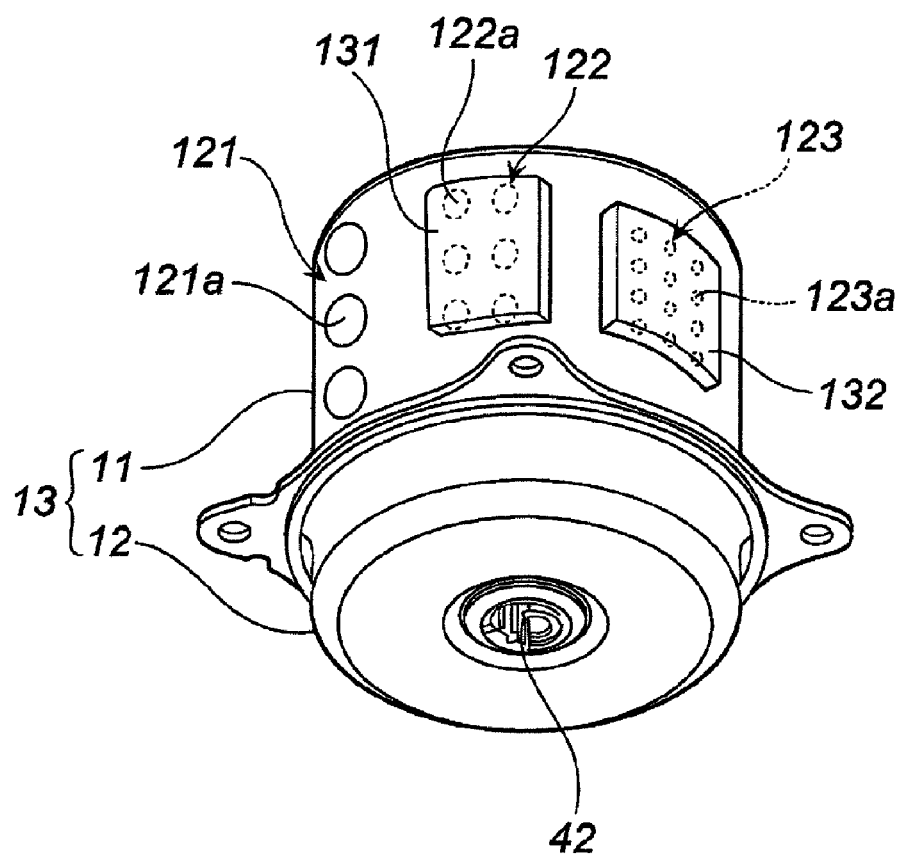
FIG. 3 shows a perspective view of a gas generator of another embodiment of the present invention.

(2) Gas Generator Shown in FIG. 3

FIG. 3 is a perspective view showing the exterior appearance of a gas generator of another embodiment of the present invention, wherein the internal structure of the gas generator is the same as the one shown in FIG. 2 or the one that is known. The gas generator shown in FIG. 3 is suitable as a gas generator for a passenger side next to the driver.

The peripheral surface of the diffuser 11 has a maximum-diameter gas discharge port group 121 formed by a plurality of (three, in FIG. 3) gas discharge ports 121a having the maximum diameter, an intermediate-diameter gas discharge port group 122 formed by a plurality of (six, in FIG. 3) gas discharge ports 122a having an intermediate diameter, and a minimum-diameter gas discharge port group 123 formed by a plurality of (twelve, in FIG. 3) gas discharge ports 123a having the minimum diameter. It should be noted that on the back of the gas generator that is not illustrated in the drawing, similarly, one or two of each of the maximum-diameter gas discharge port group 121, intermediate-diameter gas discharge port group 122 and minimum-diameter gas discharge port group 123 may be formed.

Each of the maximum-diameter gas discharge port group 121, the intermediate-diameter gas discharge port group 122 and the minimum-diameter gas discharge port group 123 is sealed, from the inside, by the same aluminum sealing tape having a thickness of approximately 50 μm.

When the gas generator is activated, the maximum-diameter gas discharge port group 121 is opened at pressure smaller than that required to open the intermediate-diameter gas discharge port group 122. When the gas generator is activated, the intermediate-diameter gas discharge port group 122 is opened at pressure smaller than that required to open the minimum-diameter gas discharge port group 123.

The maximum-diameter gas discharge port group 121, the intermediate-diameter gas discharge port group 122 and the minimum-diameter gas discharge port group 123 have the plurality of gas discharge ports 121a, 122a and 123a that are disposed in rectangular areas respectively, and these areas are separated from one another.

A first cooling filter 131 is provided for the intermediate-diameter gas discharge port group 122 from the outside so as to completely cover all of the gas discharge ports 122a. A second cooling filter 132 is provided for the minimum-diameter gas discharge port group 123 from the outside so as to completely cover all of the gas discharge ports 123a. The maximum-diameter gas discharge pot group 121 is not covered from the outside by a cooling filter.

The first cooling filter 131 and the second cooling filter 132 are similar to the cooling filter 31 shown in FIG. 1, but since the bulk density of the second cooling filter 132 is larger than the bulk density of the first cooling filter 131, the cooling effect of the second cooling filter 132 is more significant than the cooling effect of the first cooling filter 131.

Next is described an operation performed when incorporating the gas generator shown in FIG. 3 into an airbag apparatus of a vehicle.

In the case in which the temperature of the environment of the vehicle is low (for example, in a high latitude area in the winter (approximately −20° C.)), the internal pressure obtained when the gas generating agent is burned is low, thus only the sealing tape sealing the maximum-diameter gas discharge port group 121 from the inside ruptures. Then, the combustion gas is discharged only from the maximum-diameter gas discharge port group 121, inflating an airbag. At this moment, the sealing tapes that seal the intermediate-diameter gas discharge port group 122 and the minimum-diameter gas discharge port group 123 from the inside do not rupture, thus these gas discharge port groups are not opened. Therefore, since the total open area is small, the decrease of the internal pressure is restrained, and the burning rate of the gas generating agent is prevented from decreasing.

In the case in which the temperature of the environment of the vehicle is an ambient temperature (approximately 20° C.), the housing internal pressure further increases, and thereby the sealing tapes that seal the maximum-diameter gas discharge port group 121 and the intermediate-diameter gas discharge port group 122 from the inside rupture. Then, only the gas that passes through the intermediate-diameter gas discharge port group 122 is cooled by the first cooling filter 131, thus the internal pressure is decreased due to the larger total open area and some of the discharged gas is cooled, the occurrence of the difference in the output pressures in activations at the ambient and low temperatures is prevented.

In the case in which the temperature of the environment of the vehicle is high (when, for example, the vehicle departed and then soon had an accident after being parked for a long time during the summer with the doors of the vehicle closed (approximately 80° C.)), all of the sealing tapes sealing the maximum-diameter gas discharge port group 121, the intermediate-diameter gas discharge port group 122 and the minimum-diameter gas discharge port group 123 rupture, whereby all of the gas discharge port groups are opened. At this moment, the gas that passes through the intermediate-diameter gas discharge port group 122 is cooled by the first cooling filter 131, and the gas that passes through the minimum-diameter gas discharge port group 123 is cooled by the second cooling filter 132, thus the total open area becomes larger and the degree of cooling the combustion gas increases more than those in the ambient temperature, preventing the occurrence of the difference in the output pressures in activations at the ambient and high temperatures is prevented.

Figure 4:
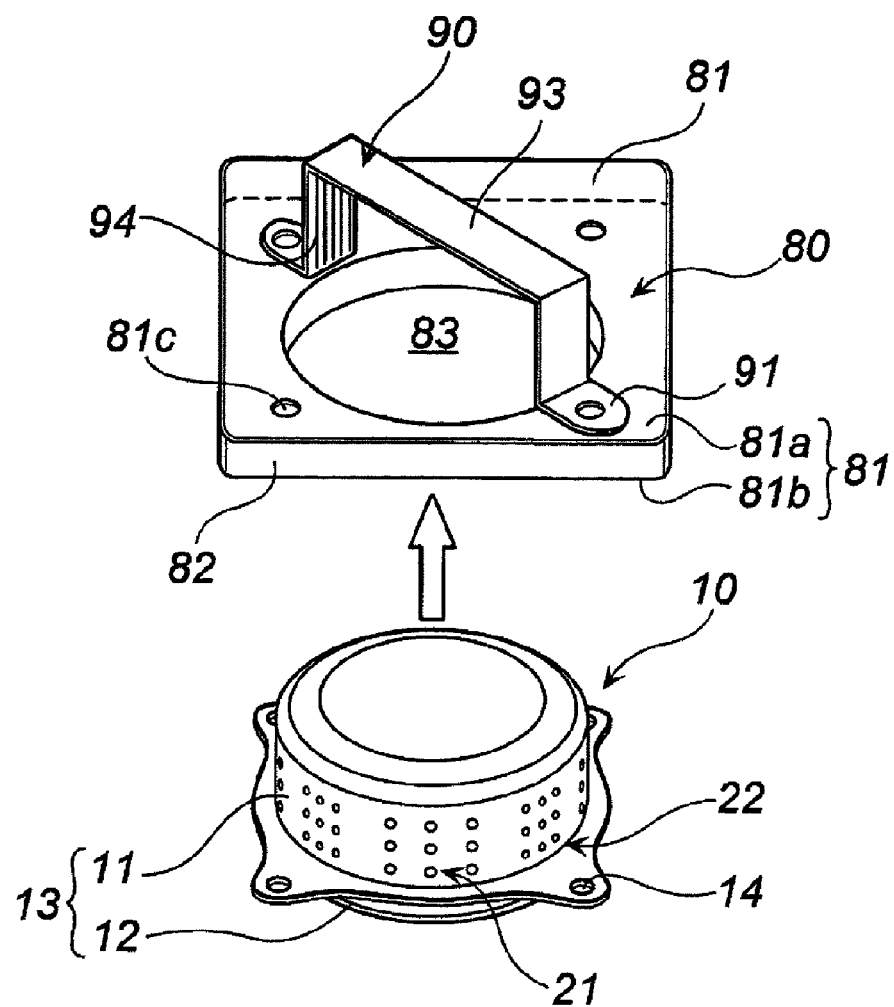
FIG. 4 shows a diagram for explaining assembling of a restraining device of the present invention.

(3) Restraining Device Shown in FIG. 4

Figure 5:
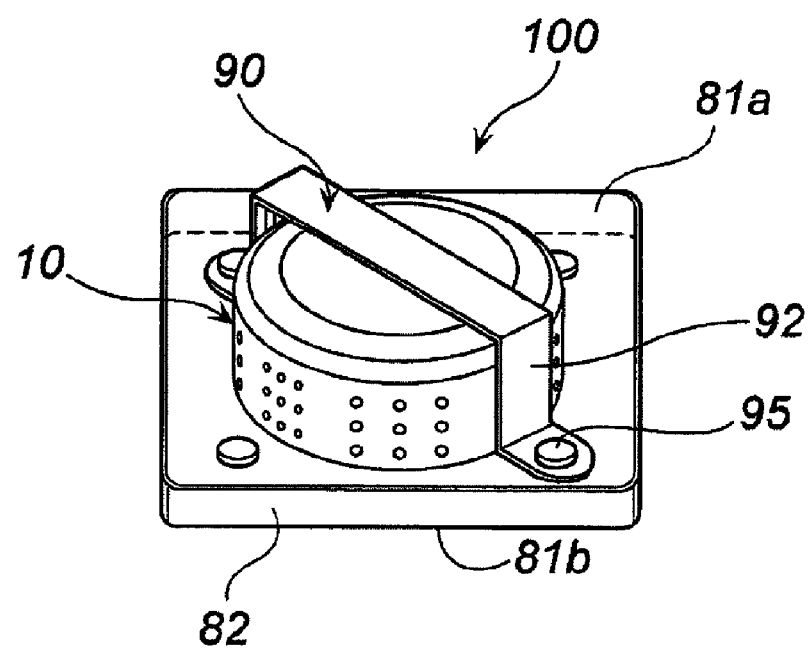
FIG. 5 shows a perspective view of the restraining device of the present invention.
Figure 9:
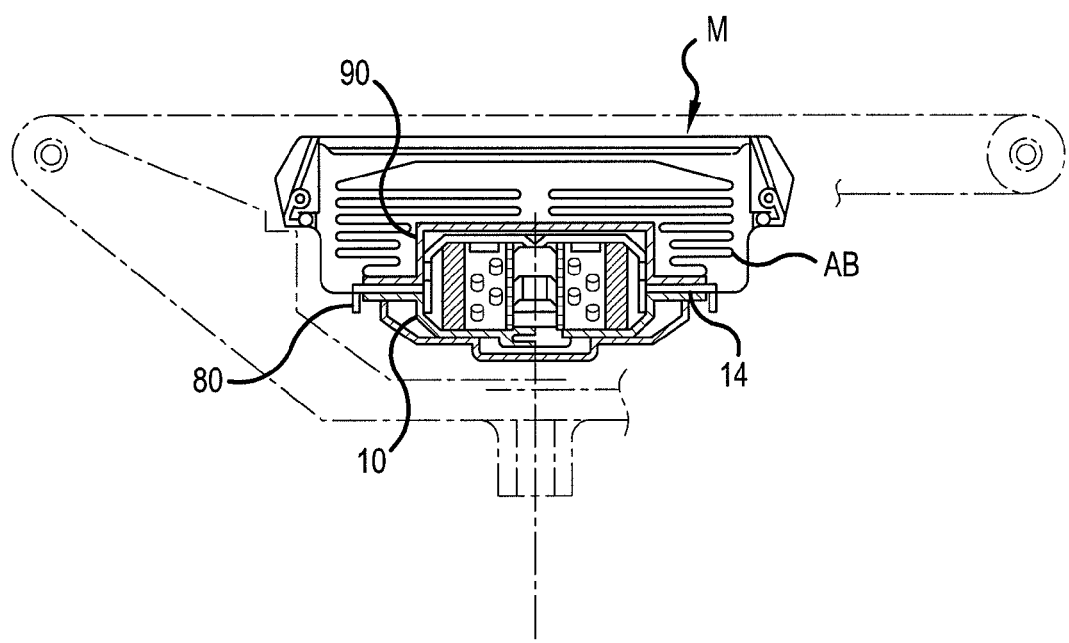
FIG. 9 shows schematical view of a gas generator accommodated in a module case.

FIG. 4 is a diagram for explaining assembling of a restraining device (an airbag apparatus) in which the gas generator 10 (however, the cooling filter 31 is not provided) shown in FIG. 1 and FIG. 2 is used, and FIG. 5 is a perspective view of a restraining device 100 obtained after assembly. It should be noted, as shown schematically in FIG. 9 that, an airbag AB is accommodated in a module case M in combination with the gas generator 10. A combination itself of a module case, an airbag and a gas generator is known and described in, for example, FIG. 6 of JP-A No. 10-95302.

A fixing member 80 of the gas generator includes a base 81 (an upper surface 81a and a lower surface 81b) and a peripheral wall portion 82, wherein the base 81 has a central hole 83. The base 81 has a total of four holes 81c in the four corners.

The gas generator 10 is fitted into the central hole 83 of the base 81, and a total of four holes 14 provided in a flange portion of the housing 13 are fixed respectively to the four holes 81c of the base 81 by four bolts 95 and accordingly, the housing is attached to the fixing member 80.

A cooling member 90 is attached to the fixing member 80 along with the gas generator 10 by means of the holes of the fixing member 80. The cooling member 90 has a thickness of 1 mm and is made of iron.

The cooling member 90 has two attaching portions 91 in contact with the base 81, two cooling plates 92 provided perpendicular to the two attaching portions 91 respectively, and a supporting plate 93 provided to bridge between the two cooling plates 92.

The two cooling plates 92 face the minimum-diameter gas discharge port groups 22 located within two areas of the gas generator 10. In FIG. 5, the minimum-diameter gas discharge port group 22 on the front side is hidden by the cooling plate 92. Each of the internal surfaces of the two cooling plates 92 faces each of the minimum-diameter gas discharge port groups 22 with a space therebetween, and waveform concaves and convexes 94 are formed on this internal surface such that the contact area thereof with the combustion gas is increased.

When the combustion gas is discharged from the minimum-diameter gas discharge port groups 22, the combustion gas is cooled after colliding with the cooling plates 92 and thereafter flows into the airbag. The cooling plates 92 perform the same operation as the cooling filter 31 shown in FIG. 1. Therefore, the operation same as those shown in FIG. 1 and FIG. 2 is performed, whereby the occurrence of the difference in the output pressure of the gas generator, which is caused by the environmental temperature difference, can be restrained, and addition of an excessive load to the airbag is prevented.

Figure 6:
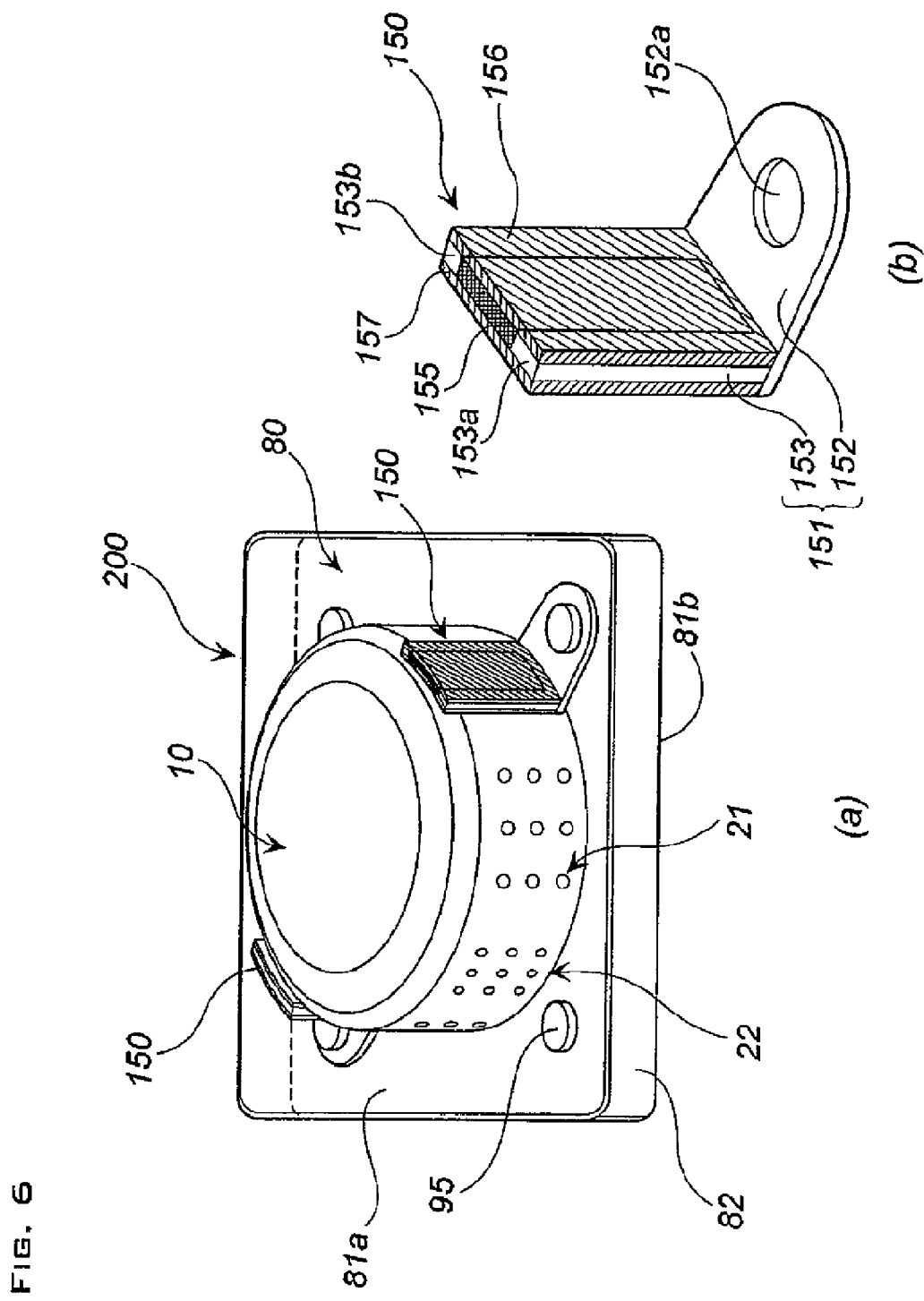
FIG. 6(a) shows a perspective view of a restraining device of another embodiment of the present invention.
FIG. 6(b) shows a partial view of (a)

(4) Restraining Device Shown in FIG. 6

FIG. 6 is a perspective view of a restraining device (airbag apparatus) 200 in which the gas generator 10 shown in FIG. 1 and FIG. 2 (however, the cooling filter 31 is not provided) is used. It should be noted that the airbag accommodated in the case in combination with the gas generator is not illustrated.

Each of two cooling members 150 is formed such that a cooling filter 155 is attached to a fixing member 151 that has an attaching portion 152 and a supporting portion 153 (divided into supporting portions 153a and 153b) provided perpendicular to the attaching portion 152, and such that the cooling filter 155 is sandwiched from both sides by wire mesh members 156, 157 functioning as auxiliary members for fixation. The cooling filter 155 is similar to the cooling filter 31 shown in FIG. 1.

The attaching portion 152 has a hole 152a and is fixed, together with the gas generator 10, to the fixing member 80 by means of the hole 152a.

The two cooling members 150 are disposed so as to face, respectively, the minimum-diameter gas discharge port groups 22 located within two areas of the gas generator 10, but may be disposed so as to face all of the minimum-diameter gas discharge port groups 22. In FIG. 6, the minimum-diameter gas discharge port group 22 on the front side is hidden by the cooling member 150. It should be noted that a space may be formed between each minimum-diameter gas discharge port group 22 and the cooling filter 155 by adjusting the position to attach the fixing member 151.

When the combustion gas is discharged from the minimum-diameter gas discharge port groups 22, the combustion gas is cooled after colliding with the cooling members 150 and thereafter flows into the airbag. The cooling members 150 perform the same operation as the cooling filter 31 shown in FIG. 1. Therefore, the operation same as those shown in FIG. 1 and FIG. 2 is performed, whereby the occurrence of the output difference in the gas generator, which is caused by the environmental temperature difference, can be restrained, and addition of an excessive load to the airbag is prevented.

The gas generator of the present invention may be formed to have the gas discharge port groups with different port diameters, but may be formed such that the gas discharge port diameters of each of the gas discharge port groups are made uniform and the gas discharge port groups are opened at different pressure by changing the thickness, material and the like of the sealing tapes.

Figure 7:
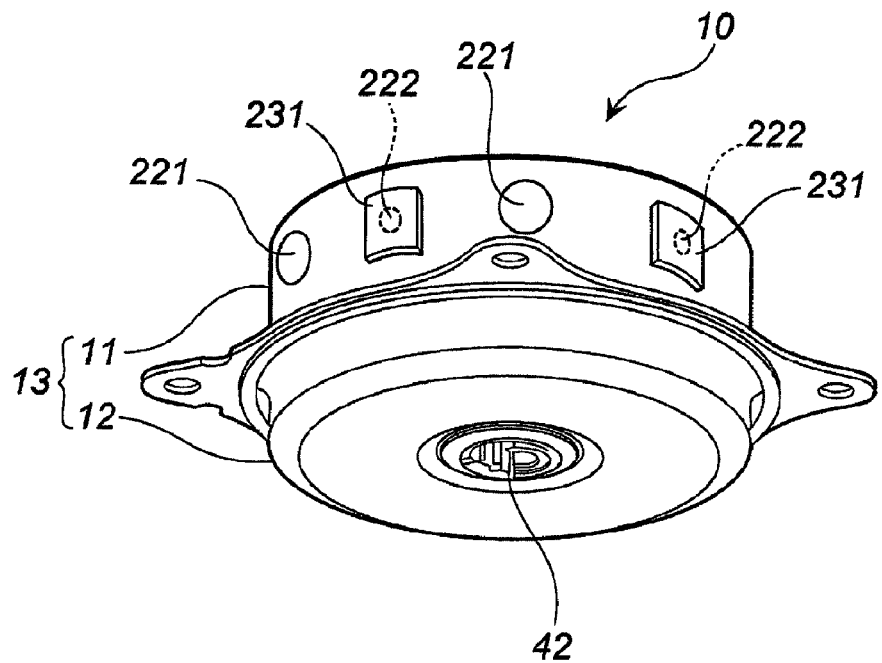
FIG. 7 shows perspective view of a gas generator of still another embodiment of the present invention.

(5) Gas Generator Shown in FIG. 7

FIG. 7 is a perspective view showing the exterior appearance of a gas generator of another embodiment of the present invention. The gas generator shown in FIG. 7 is suitable as a gas generator for a driver side, and has the same structure as the one shown in FIG. 2, except that the height is lower than those shown in FIG. 1 through FIG. 3.

The peripheral surface of the diffuser shell 11 has a plurality of larger-diameter gas discharge ports 221 (second gas discharge port) and a plurality of smaller-diameter gas discharge ports 222 (first gas discharge port). These gas discharge ports are disposed alternately at regular intervals on the peripheral surface of the diffuser shell 11.

Each of the larger-diameter gas discharge ports 221 and each of the smaller-diameter gas discharge ports 222 are both sealed by the same aluminum sealing tape having a thickness of approximately 50 µm.

When the gas generator is activated, the larger-diameter gas discharge port 221 is opened at pressure smaller than that required to open the smaller-diameter gas discharge port 222. When the gas generator is activated, the smaller-diameter gas discharge port 222 is opened at pressure larger than that required to open the larger-diameter gas discharge port 221.

The smaller-diameter gas discharge port 222 is covered, from the outside, by a first cooling filter 231. The larger-diameter gas discharge port 221 is not covered from the outside by a cooling filter.

Next is described an operation performed when incorporating the gas generator shown in FIG. 7 into an air bag apparatus of a vehicle.

In the case in which the temperature of the environment of the vehicle is an ambient temperature (approximately 20° C.), the internal pressure obtained when the gas generating agent 51 is burned (the pressure inside the combustion chamber 50) is not so high, thus only the sealing tape sealing the larger-diameter gas discharge port 221 from the inside ruptures. Then, the combustion gas is discharged only from the larger-diameter gas discharge port 221, inflating an airbag. At this moment, the sealing tape covering the smaller-diameter gas discharge port 222 from the inside does not rupture, thus the smaller-diameter gas discharge port 222 is not opened. Therefore, since the total open area is small, the decrease of the internal pressure is restrained, and the burning rate of the gas generating agent 51 is prevented from decreasing.

In the case in which the temperature of the environment of the vehicle is high (when, for example, the vehicle departed and then soon had an accident after being parked for a long time during the summer with the doors of the vehicle closed (approximately 80° C.)), the temperature inside the vehicle is still high, and the internal pressure of the gas generator 10 at the time of activation is higher than that obtained at the ambient temperature, thus all of the sealing tapes rupture, whereby the larger-diameter gas discharge port 221 and the smaller-diameter gas discharge port 222 are opened.

In this manner, since the larger-diameter gas discharge port 221 and smaller-diameter gas discharge port 222 are opened, the increase of the housing internal pressure is inhibited, and the burning rate of the gas generating agent 51 is also prevented from increasing. The temperature of the generated combustion gas itself is higher than that obtained at the ambient temperature. However, the combustion gas passing through the smaller-diameter gas discharge port 222 is cooled as it passes through the cooling filter 231, and then flows into the airbag, thus the increase of the temperature of the entire combustion gas is restrained and fluctuation of the output pressure is also prevented.

The gas generator of the present invention may be formed to have the gas discharge ports with different port diameters, but may be formed such that the gas discharge port diameters are made uniform and the gas discharge ports are opened at different pressure by changing the thickness, material and the like of the sealing tapes.

Figure 8:
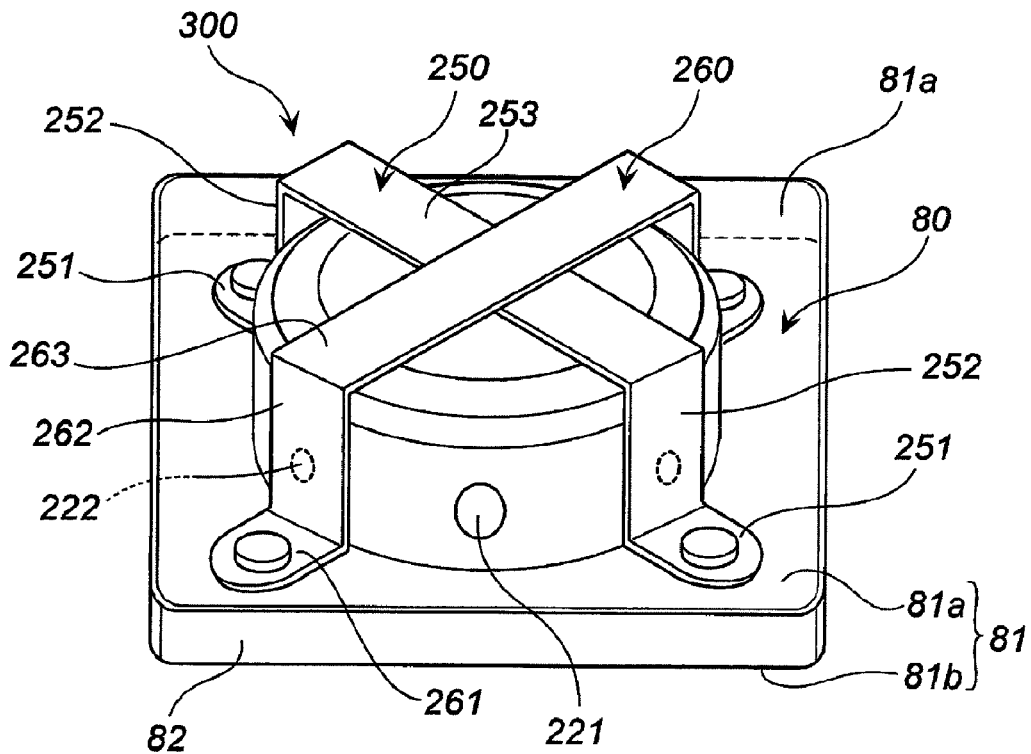
FIG. 8 shows a perspective view of a restraining device of the still another embodiment of the present invention.

(6) Restraining Device Shown in FIG. 8

FIG. 8 is a perspective view of a restraining device (air bag apparatus) 300 in which the gas generator 10 shown in FIG. 7 (however, the cooling filter 231 is not provided) is used. It should be noted that the airbag that is accommodated in the case in combination with the gas generator is not illustrated.

A first cooling member 250 and a second cooling member 260 are attached to the fixing member 80. The first cooling member 250 and second cooling member 260 are both made of iron and have a thickness of 1 mm.

The first cooling member 250 has two attaching portions 251 that are in contact with the base 81, two cooling plates 252 that are provided perpendicular to the two attaching portions 251 respectively, and a supporting plate 253 provided to bridge between the two cooling plates 252.

The second cooling member 260 has two attaching portions 261 that are in contact with the base 81, two cooling plates 262 that are provided perpendicular to the two attaching portions 261 respectively, and a supporting plate 263 provided to bridge between the two cooling plates 262.

The first cooling member 250 and the second cooling member 260 are attached such that the respective supporting plates 253 and 263 intersect with each other.

The two cooling plates 252 of the first cooling member 250 and the two cooling plates 262 of the second cooling member 260 face the four smaller-diameter gas discharge ports 222 of the gas generator 10 respectively. The waveform concaves and convexes 94 shown in FIG. 4 may be formed on each of the surfaces of the cooling plates 252 and cooling plates 262 facing the smaller-diameter gas discharge ports 222.

When the combustion gas is discharged from the smaller-diameter gas discharge ports 222, the combustion gas is cooled after colliding with the cooling plates 252 and cooling plates 262 and thereafter flows into the airbag. The cooling plates 252 and cooling plates 262 perform the same operation as the cooling filter 31 shown in FIG. 1. Therefore, the operation same as those shown in FIG. 1 and FIG. 2 is performed, whereby the occurrence of the output difference in the gas generator, which is caused by the environmental temperature difference, can be inhibited, and addition of an excessive load to the airbag is prevented.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing having a plurality of groups of gas discharge ports, each gas discharge port being closed from an inside of the housing by a closing member;
an ignition device accommodated inside the housing; and
a gas generating agent ignited and burnt by an activation of the ignition device to generate combustion gas,
wherein the plurality of groups of gas discharge ports includes a first group of gas discharge ports opened at a first pressure and a second group of gas discharge ports opened at a second pressure lower than the first pressure,
the gas generator further comprising:
a cooling member that covers only the first group of gas discharge ports from an outside of the housing without covering the second group of gas discharge ports.

2. The gas generator according to claim 1, wherein
a diameter of gas discharge ports in the first group is smaller than a diameter of gas discharge ports in the second group,
the first group of gas discharge ports and the second group of gas discharge ports are disposed separately in different areas,
all of the gas discharge ports in the first group and the second group are sealed, from the inside, by the same closing member, and
the gas discharge ports of the second group open at the second pressure, and the gas discharge ports of the first group open at the first pressure.

3. The gas generator according to claim 1, wherein
a diameter of the gas discharge ports in the first group is the same as a diameter of the gas discharge ports in the second group,
the first group of gas discharge ports and the second group of gas discharge ports are disposed separately in different areas, and the gas discharge ports of the first group are sealed by a closing member of a maximum strength that opens at the first pressure, and the gas discharge ports of the second group are sealed by a closing member of a minimum strength that opens at the second pressure.

4. The gas generator according to claim 1, wherein a space is provided between the first group of gas discharge ports and the cooling member.

5. The gas generator according to claim 4, wherein the cooling member is a metallic plate.

6. The gas generator according to claim 4, wherein the cooling member is a metallic plate having concaves and convexes on a surface thereof that faces the gas discharge ports of the first group.

7. A restraining device, comprising:
the gas generator according to claim 1; and
a module case accommodating the gas generator therein,
wherein the cooling member is attached to the module case.

8. The restraining device according to claim 7, further comprising:
a fixing member including a central hole for fitting the gas generator therein,
wherein the cooling member is attached to the fixing member along with the gas generator.

9. A gas generator, comprising:
a housing having a plurality of gas discharge ports, each gas discharge port being closed from an inside of the housing by a closing member;
an ignition device accommodated inside the housing; and
a gas generating agent ignited and burnt by an activation of the ignition device to generate combustion gas,
wherein the plurality of discharge ports includes a first gas discharge port opened at a first pressure and a second gas discharge port opened at a second pressure lower than the first pressure,
the gas generator further comprising:
a cooling member that covers only the first gas discharge port from an outside of the housing without covering the second gas discharge port.

10. The gas generator according to claim 9, wherein
a diameter of the first gas discharge port is smaller than a diameter of the second gas discharge port,
the first gas discharge port and the second gas discharge port are disposed separately in different areas,
the first gas discharge port and the second gas discharge port are sealed, from the inside, by the same closing member, and
the second gas discharge port opens at the second pressure, and the first gas discharge port opens at the first pressure.

11. The gas generator according to claim 9, wherein
a diameter of the first gas discharge port is the same as a diameter of the second gas discharge port,
the first gas discharge port and the second gas discharge port are disposed separately in different areas, and
the first gas discharge port is sealed by a closing member of a maximum strength that opens at the first pressure, and the second gas discharge port is sealed by a closing member of a minimum strength that opens at the second pressure.

12. The gas generator according to claim 11, wherein the cooling member is a metallic plate.

13. The gas generator according to claim 11, wherein the cooling member is a metallic plate having concaves and convexes on a surface thereof that faces the first gas discharge port.

14. The gas generator according to claim 9, wherein a space is provided between the first gas discharge port and the cooling member.

15. A restraining device, comprising:
- the gas generator according to claim 9; and
- a module case accommodating the gas generator therein, wherein the cooling member is attached to the module case.

16. The restraining device according to claim 15, further comprising:
- a fixing member including a central hole for fitting the gas generator therein,
- wherein the cooling member is attached to the fixing member along with the gas generator.

* * * * *